United States Patent
Riley

(10) Patent No.: US 10,156,468 B2
(45) Date of Patent: Dec. 18, 2018

(54) DYNAMIC CALIBRATION COMPENSATION FOR FLOW METER

(71) Applicant: SHARKNINJA OPERATING LLC, Newton, MA (US)

(72) Inventor: Justin Garrett Riley, Medway, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 444 days.

(21) Appl. No.: 14/887,562

(22) Filed: Oct. 20, 2015

(65) Prior Publication Data

US 2017/0108367 A1    Apr. 20, 2017

(51) Int. Cl.
- G01F 25/00 (2006.01)
- A47J 31/10 (2006.01)
- A47J 31/057 (2006.01)

(52) U.S. Cl.
CPC ........ G01F 25/0007 (2013.01); A47J 31/057 (2013.01); A47J 31/10 (2013.01)

(58) Field of Classification Search
CPC ...... A47J 31/057; A47J 31/10; G01F 25/0007
See application file for complete search history.

(56) References Cited

U.S. PATENT DOCUMENTS

| | | | |
|---|---|---|---|
| 4,651,632 A | 3/1987 | Motsch | |
| 7,279,190 B1 * | 10/2007 | Lassota | A47J 31/402 426/433 |
| 7,677,158 B2 * | 3/2010 | McDuffie | A47J 31/4407 99/289 R |
| 8,225,708 B2 * | 7/2012 | Lassota | A47J 31/56 219/477 |
| 8,877,276 B2 * | 11/2014 | Cominelli | A47J 31/46 426/431 |
| 9,696,742 B2 * | 7/2017 | Cook | G01F 1/3254 |
| 9,706,873 B2 * | 7/2017 | Anthony | A47J 31/002 |
| 2005/0247205 A1 * | 11/2005 | Chen | A47J 31/057 99/279 |
| 2006/0196363 A1 * | 9/2006 | Rahn | A47J 31/106 99/279 |

(Continued)

FOREIGN PATENT DOCUMENTS

| EP | 1593328 A2 | 11/2005 |
|---|---|---|
| WO | 2005077232 A2 | 8/2005 |

(Continued)

OTHER PUBLICATIONS

PCT ISR Written Opinion; International Application No. PCT/US2016/056744; International Filing Date: Oct. 13, 2016; dated Jan. 3, 2017; pp. 1-6.

(Continued)

*Primary Examiner* — Freddie Kirkland, III
(74) *Attorney, Agent, or Firm* — Cantor Colburn LLP

(57) ABSTRACT

A beverage brewing apparatus is provided including a reservoir, a brew basket configured to container a flavorant for preparing a brewed beverage, and a heating mechanism fluidly coupled to the reservoir and the brew basket. A flow meter is configured to measure a volume of fluid supplied from the reservoir to the brew bask. The flow meter is configured to calibrate dynamically in response to at least one operating parameter of the beverage brewing apparatus.

3 Claims, 8 Drawing Sheets

(56) References Cited

U.S. PATENT DOCUMENTS

| | | | |
|---|---|---|---|
| 2007/0119308 A1* | 5/2007 | Glucksman | A47J 31/10 |
| | | | 99/275 |
| 2007/0186780 A1* | 8/2007 | Clark | A47J 31/057 |
| | | | 99/275 |
| 2015/0359374 A1 | 12/2015 | Anthony et al. | |
| 2015/0359378 A1 | 12/2015 | Anthony et al. | |
| 2016/0169730 A1* | 6/2016 | Wang | G01F 25/0007 |
| | | | 702/100 |

FOREIGN PATENT DOCUMENTS

| | | |
|---|---|---|
| WO | 2007050315 A1 | 5/2007 |
| WO | 2007059275 A2 | 5/2007 |

OTHER PUBLICATIONS

PCT Notification of Transmittal of the International Search Report; International Application No. PCT/US2016/056744; International Filing Date: Oct. 13, 2016; dated Jan. 3, 2017; pp. 1-6.
International Preliminary Report on Patentability for International Application No. PCT/US2016/056744, dated Apr. 24, 2018 (7 pp.).

* cited by examiner

DYNAMIC CALIBRATION COMPENSATION FOR FLOW METER

BACKGROUND

This application relates to a flow meter, and more specifically to dynamic calibration of a flow meter of a beverage brewing apparatus.

A plurality of factors influence the flavor when brewing a cup of coffee, including the quantity of coffee, the quantity of water, the temperature of the water, and the contact time between the coffee and the water. In many systems configured to brew a beverage such as coffee, a flow meter is used to monitor a volume of water delivered to the coffee. The flow meter generally includes a rotor having opposing polarity magnets embedded therein. The rotor is configured to spin about a central axis as water flows there through. As the flow meter rotates, these magnets pass a Hall Effect sensor, functioning as a switch that it activated and deactivated by the magnetic fields of the magnets. For every rotation of the rotor, a high and low signal is observed by the Hall Effect sensor.

Under constant conditions, a high quality flow meter may be accurate to within 0.5%, meaning that each toggle in the flow meter signal can be related directly to a volume of water. For example, if a system intends to deliver 1000 mL of water and the flow meter is calibrated to deliver 0.5 mL per pulse, a controller will simply track the total number of pulses until 2000 pulses have been observed. Accuracy of these systems is dependent upon the linearity of the flow meter over the operating range of the system. In order to control the operation conditions of a beverage brewing system a pump is typically used to control the flow rate. However, in systems where the operating conditions are not controlled, the flow rate of fluid through the flow meter may change based on variates in the wall voltage, boiler power, boiler efficiency, water temperature, or other influencing factors. As these factors shift the flow rate away from the nominal target rate, the performance of the flow meter similarly shifts, thereby compromising the accuracy of the system.

SUMMARY

According to one embodiment, a beverage brewing apparatus is provided including a reservoir, a brew basket configured to container a flavorant for preparing a brewed beverage, and a heating mechanism fluidly coupled to the reservoir and the brew basket. A flow meter is configured to measure a volume of fluid supplied from the reservoir to the brew bask. The flow meter is configured to calibrate dynamically in response to at least one operating parameter of the beverage brewing apparatus.

In addition to one or more of the features described above, or as an alternative, in further embodiments the at least one operating parameter includes voltage of the beverage system.

In addition to one or more of the features described above, or as an alternative, in further embodiments the at least one operating parameter includes a temperature of the fluid.

According to another embodiment, a method of dynamically calibrating a flow meter is provided including identifying a relationship between calibration variance and pulse rate of the flow meter to form an advanced logic calibration and applying the advanced logic calibration to the flow meter.

In addition to one or more of the features described above, or as an alternative, in further embodiments the advanced logic calibration is applied to each pulse observed by the flow meter.

In addition to one or more of the features described above, or as an alternative, in further embodiments the relationship between calibration variance and pulse rate is generally linear.

In addition to one or more of the features described above, or as an alternative, in further embodiments the relationship between calibration variance and pulse rate of the flow meter is determined using data collected during operation of a beverage brewing apparatus.

In addition to one or more of the features described above, or as an alternative, in further embodiments the advanced calibration logic is based on data collected from a plurality of beverage brewing apparatuses.

In addition to one or more of the features described above, or as an alternative, in further embodiments the method includes identifying a relationship between calibration variance and flow rate of a fluid through the flow meter to form an advanced logic calibration. A relationship between between flow rate and pulse rate is then determined.

In addition to one or more of the features described above, or as an alternative, in further embodiments an average pulse rate per time interval is calculated for the plurality of beverage brewing apparatuses. The advanced logic calibration is then applied to the average pulse rate.

In addition to one or more of the features described above, or as an alternative, in further embodiments an operating condition of at least one of the plurality of beverage brewing apparatuses is different.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Figure 1:
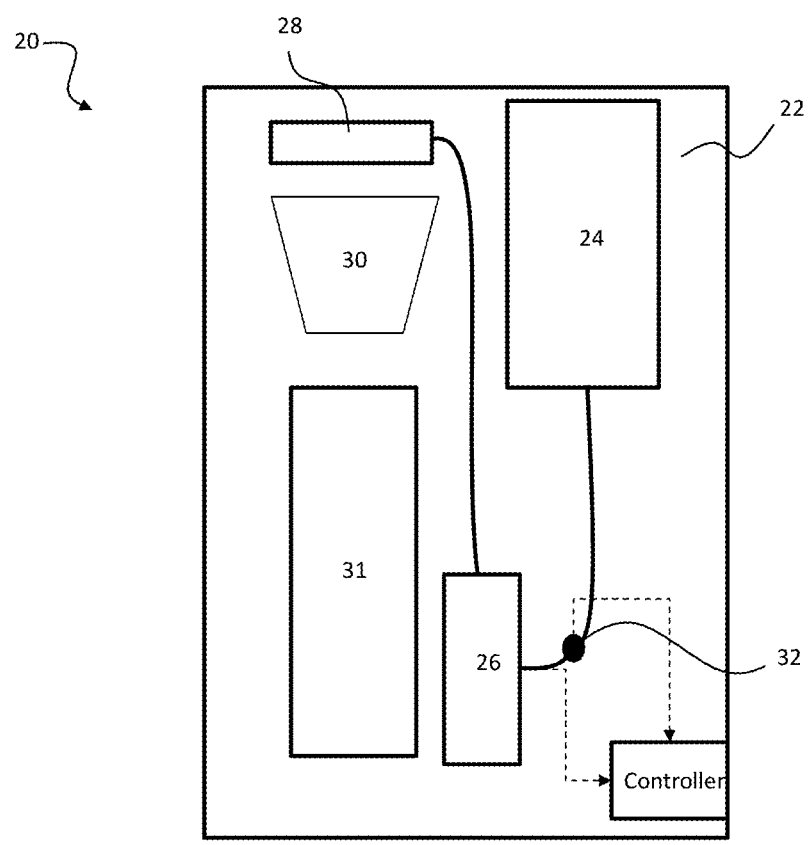
FIG. 1 is a schematic diagram of an example of a beverage brewing apparatus.

With reference now to FIG. 1, a schematic diagram of an example of a basic automatic beverage brewing apparatus 20, such as a coffee maker for example, is illustrated in more detail. The apparatus includes a housing 22, a reservoir 24, a heating mechanism 26, a shower head 28, and a brew basket 30. The reservoir 24, heating mechanism 26, showerhead 28, and brew basket 30 are arranged sequentially in fluid communication. Upon activation of the apparatus 20, water or another fluid stored within the reservoir 30, is provided to a heating mechanism 26. After being heated to a desired temperature, the water is provided to the shower head 28. The shower head is aligned with and disposed vertically above the brew basket. The water is configured to flow through one or more holes formed in the shower head onto coffee grounds or another flavorant contained within the brew basket. The fluid containing a portion of the flavorant, is provided to a container 31 via an outlet formed near the bottom of the brew basket.

As illustrated in FIG. 1, a flow meter 32 may be arranged within a conduit extending between the water reservoir 24 and the heating mechanism 26. As shown, the water reservoir 24 may be vertically aligned with the flow meter 32 such that water is fed to the system 20, and more specifically to the flow meter 32, by gravity. The flow meter 32 is configured to monitor an amount of water passing there through, which is generally indicative of the amount of water provided to the shower head 28. Various types of flow meters are within the scope of the disclosure. For example, the flow meter 32 may be a rotatable paddle wheel where each rotation generates a signal indicating that a known amount of water has passed through the flow meter 92. Further detail on this type of beverage brewing apparatus 20 is disclosed in U.S. patent application Ser. No. 14/568,471 filed on Dec. 12, 2014 and U.S. patent application Ser. No. 14/812,731 filed on Jul. 29, 2015, the contents of both of which are incorporated herein by reference. However, it should be understood that the beverage brewing apparatus 20 described herein is intended as an example only, and any other apparatus including a flow meter is within the scope of the invention.

With reference now to FIGS. 2-8, a software algorithm for dynamically calibrating the flow meter 32 based on the operational parameters of the beverage brewing system 20, also referred to herein as "advanced calibration logic", is described in more detail. The brewing apparatus 20 is configured to provide a known volume of fluid when operated in a first mode. To generate an equation to be applied to operation of the flow meter 32 as advanced calibration logic, the relationship between pulse rate and the calibration variance of the flow meter 32 must be identified.

By measuring the actual volume of fluid provided and by monitoring one or more operational parameters of the system 20, a relationship between operation of the flow meter 32 and one or more parameters of the system 20 may be determined. For example, as shown in Table 1 illustrated below, the voltage provided to the flow meter 32 and the time required to provide the desired volume of fluid are measured.

TABLE 1

Recorded Measurements from Test Unit 1

| Voltage | Volume Delivered | vs. Target | Effective Time (s) | Flow Rate |
|---|---|---|---|---|
| 128 | 1267 | −1.1% | 305 | 4.15 |
| 128 | 1259 | −1.7% | 303 | 4.16 |
| 120 | 1294 | 1.0% | 340 | 3.81 |
| 120 | 1291 | 0.8% | 337 | 3.83 |

TABLE 1-continued

Recorded Measurements from Test Unit 1

| Voltage | Volume Delivered | vs. Target | Effective Time (s) | Flow Rate |
|---|---|---|---|---|
| 112 | 1310 | 2.3% | 382 | 3.43 |
| 112 | 1323 | 3.3% | 386 | 3.43 |
| 104 | 1351 | 5.5% | 447 | 3.02 |
| 104 | 1348 | 5.2% | 451 | 2.99 |

Figure 2:
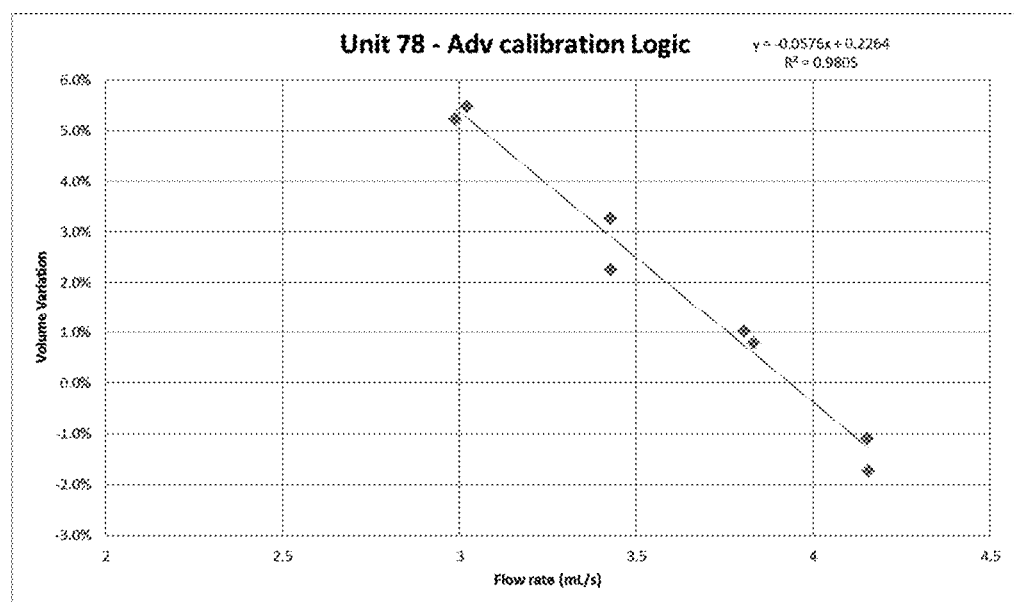
FIG. 2 is a graph comparing flow rate and volumetric variation measured for a single beverage brewing apparatus.

In the illustrated, non-limiting embodiment, the programmed volume of fluid to be provided was 1281 mL. As shown in the table above, the difference between the programmed volume and the measured volume was between −1.7% and 5.5% for each of the various test runs. Through this experimentation, it has been determined that the accuracy of the flow meter 32 fluctuates with the flow rate when the voltage applied to the system 20 is varied. A graph comparing the flow rate (mL/s) and Volume Variation of the data of Table 1 is illustrated in FIG. 2.

Figure 3:
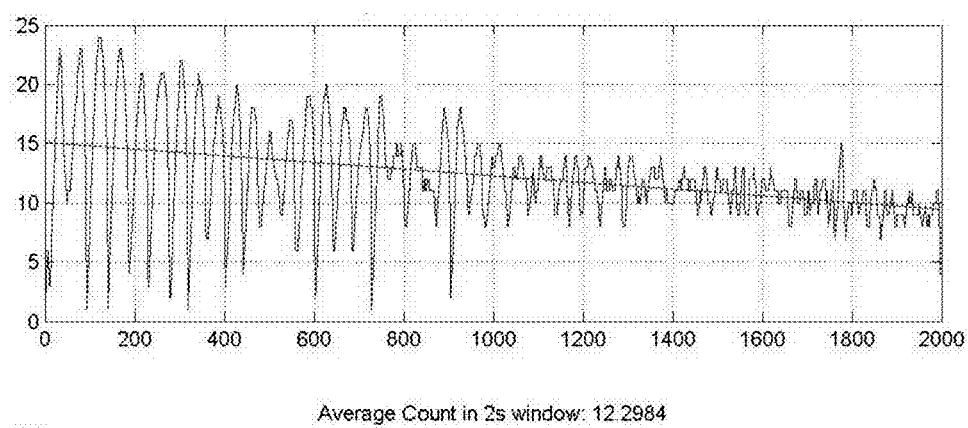
FIG. 3 is a graph illustrating the pulses of a flow meter over a set period of time for a single beverage brewing apparatus.

During operation, the system 20 is only configured to observe pulses generated by the flow meter 32 and has no knowledge of flow rate. FIG. 3 indicates the recorded pulse rates on a moving average basis, or more specifically, the number of pulses recorded in a set time period. Although a time period of 2 seconds was used in the illustrated, non-limiting embodiment, any length of time sufficient to provide an accurate representation of the data with a minimized delay is acceptable. Using this pulse information, the average flow rate can be tracked and converted into a calibration scaling factor. An example of the data recorded for a 50 pulse section of the graph of FIG. 3 is shown in Table 2 below.

TABLE 2

Time Array of recorded pulses

| Array Element | Pulse Time |
|---|---|
| 0 | 8801 |
| 1 | 8966 |
| 2 | 9086 |
| 3 | 9225 |
| 4 | 9329 |
| 5 | 9444 |
| 6 | 9542 |
| 7 | 9642 |
| 8 | 9744 |
| 9 | 9851 |
| 10 | 9946 |
| 11 | 10053 |
| 12 | 10160 |
| 13 | 10284 |
| 14 | 10391 |
| 15 | 10501 |
| 16 | 10604 |
| 17 | 10705 |
| 18 | 10800 |
| 19 | 10904 |
| 20 | 11001 |
| 21 | 11109 |
| 22 | 11209 |
| 23 | 11321 |
| 24 | 11427 |
| 25 | 5252 |
| 26 | 5335 |
| 27 | 5428 |
| 28 | 5514 |
| 29 | 5611 |
| 30 | 5703 |
| 31 | 5805 |

TABLE 2-continued

Time Array of recorded pulses

| Array Element | Pulse Time |
|---|---|
| 32 | 5901 |
| 33 | 6008 |
| 34 | 6111 |
| 35 | 6226 |
| 36 | 6338 |
| 37 | 6463 |
| 38 | 6584 |
| 39 | 6720 |
| 40 | 6852 |
| 41 | 7008 |
| 42 | 7164 |
| 43 | 7362 |
| 44 | 7581 |
| 45 | 7864 |
| 46 | 8115 |
| 47 | 8337 |
| 48 | 8513 |
| 49 | 8665 |

Figure 4:
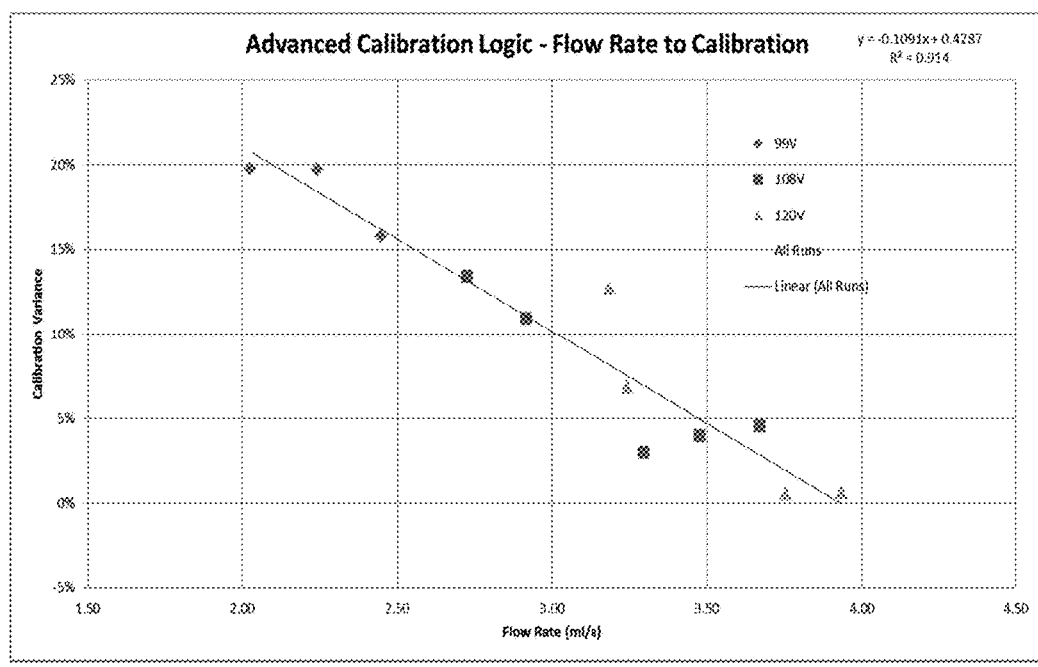
FIG. 4 is a graph comparing flow rate and calibration variation measured for a single beverage brewing apparatus.
Figure 5:
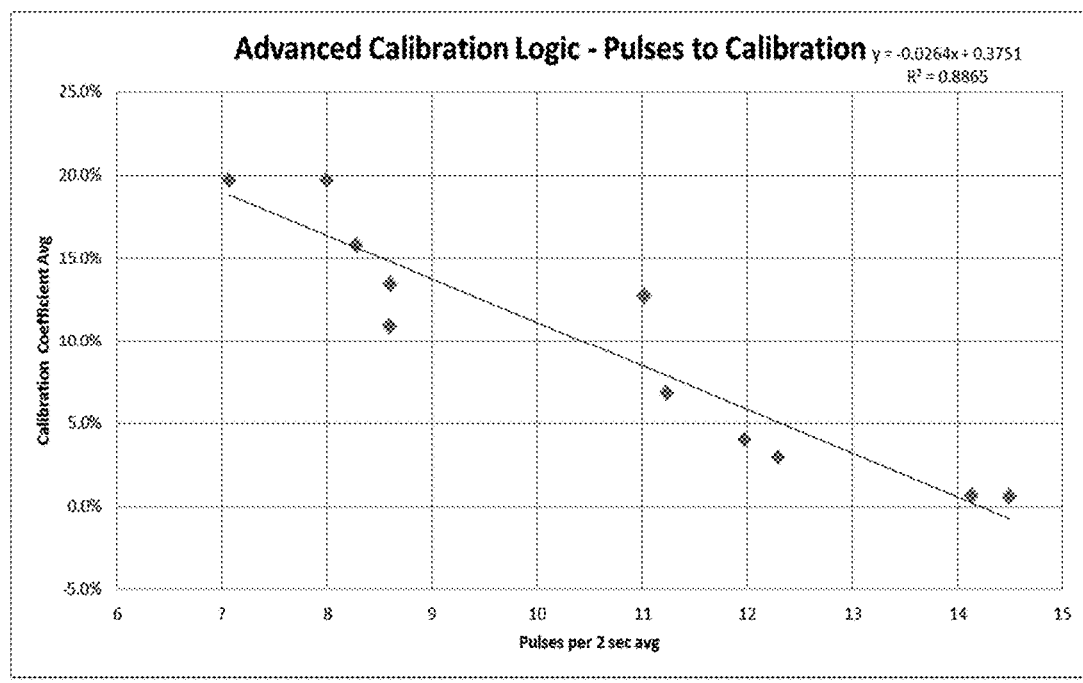
FIG. 5 is a graph comparing pulse rate and calibration variation measured for a single beverage brewing apparatus

By analyzing this data relative to voltage and temperature ranges, two graphs, shown in FIGS. 4 and 5, were generated to identify the relationship between flow rate and calibration variance (FIG. 4), as well as pulse rate and calibration variance (FIG. 5). The graph of pulse rate vs. calibration variance is configured to indicate the variation in the calibration coefficient based on how fast the flow meter 32 is rotating.

The relationship presented in FIG. 5 directly correlates a signal sent from the flow meter 32 and received by a controller of the brewing system 20 with a calibration variation. As a result, the calibration coefficient can be used to determine a total volume delivered by the flow meter 32 with each pulse. In this embodiment, for every pulse fewer recorded per 2-second averaging window, the calibration would increase by 2.64% as noted by the linear regression through the data set. In this embodiment, the nominal calibration coefficient, corresponding to a volume of water passing through the flow meter, was specified to be 0.656 milliliters of fluid per pulse under nominal conditions. If a pulse were to exist whereby the average number of pulses recorded in a 2-second window was 10.0, the scaling factor would thus be calculated as:

Scaling Factor=−0.0264*(10.0)+1.3751=1.111

This pulse, therefore, would have a delivery volume of 0.656 milliliters*1.111=0.7288 milliliters, which is then added to the total volume delivered. This scaling factor is applied to every pulse observed by the flow meter 32 until the total volume delivered has reached a prescribed target volume, in this embodiment 1281 mL.

Figure 7:
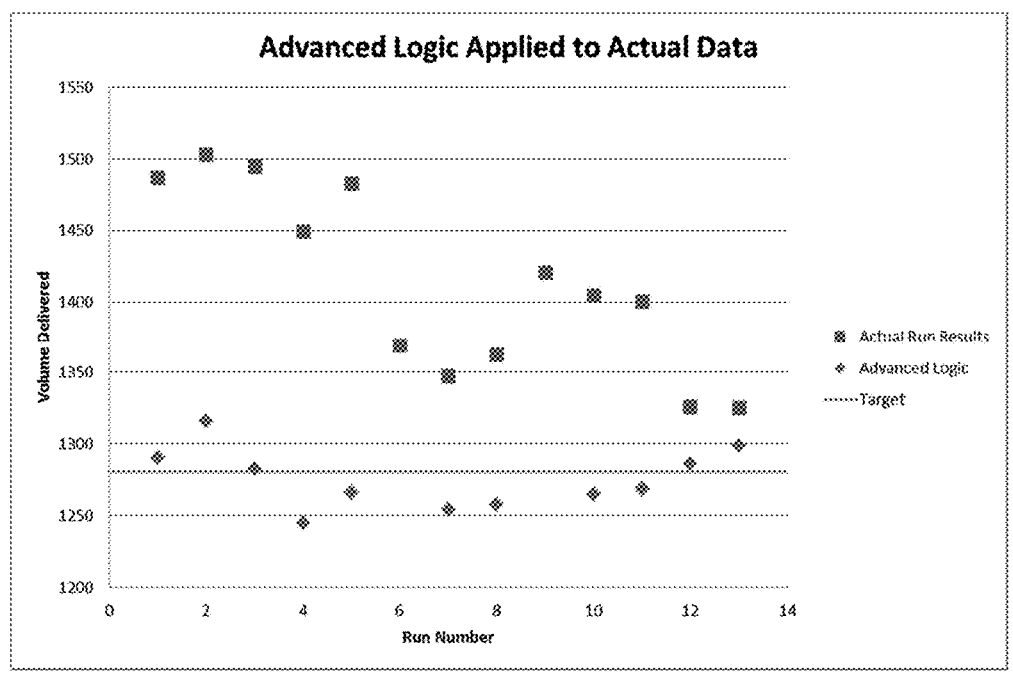
FIG. 7 is a graph representing a volume of fluid delivered by a flow meter having fixed logic and a flow meter having advanced calibration logic compared to a target volume.

This scaling factor can be applied to a recorded data set to more accurately predict the volume of fluid delivered by a flow meter 32. For example, the graph of FIG. 7 compares the volume of fluid delivered by a flow meter 32 using the fixed calibration logic, and the volume of fluid delivered by a flow meter 32 using the scaling factor of the advanced calibration logic relative to a target volume. As is clearly illustrated, the flow meter 32 using the advanced calibration logic is substantially more accurate relative to the target volume.

Figure 6:
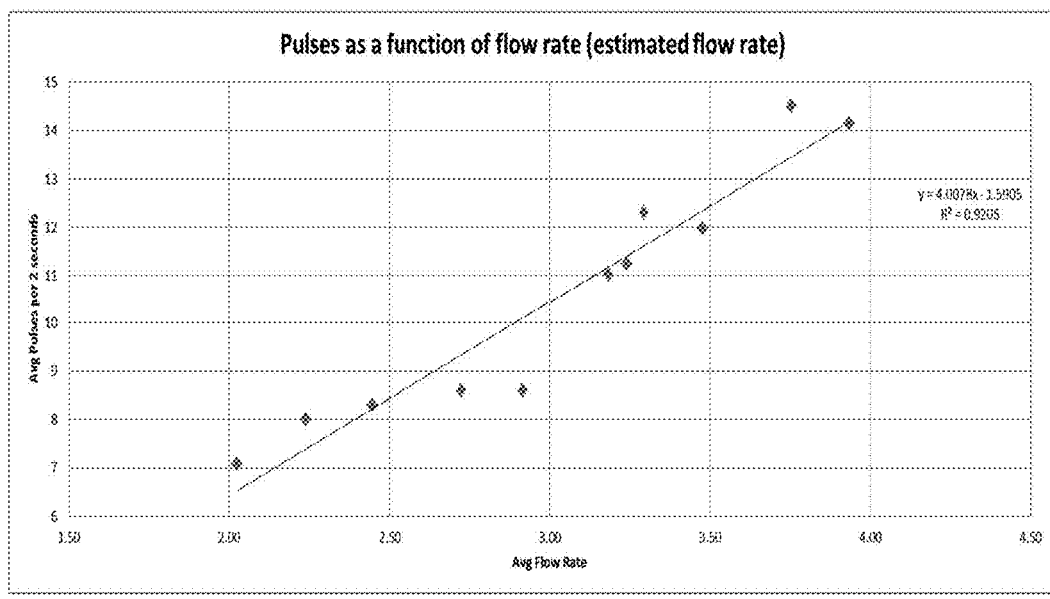
FIG. 6 is a graph comparing flow rate and pulse rate based on the measured data of a single beverage brewing apparatus.

Because both of the graphs in FIGS. 4 and 5 compare calibration variance, a relationship between the flow rate and the average pulse rate may be established. A graph illustrating the relationship between the average flow rate and the average pulse rate is illustrated in FIG. 6. This relationship enables an average pulse rate to be approximated for test runs on where only volume and time were recorded.

The data illustrated in Tables 1 and 2 and FIGS. 2-7 is representative of a single beverage brewing apparatus 20. Although each unit of a mass produced beverage brewing apparatus 20 is formed substantially identically, differences in performance may occur due to variances in manufacturing, assembly, or usage conditions. To create a universal calibration coefficient applicable to all of the units of a mass produced beverage brewing apparatus 20, similar experimentation is performed using a plurality of units of the beverage brewing apparatus 20 to create an approximation of the average pulse rates based on average flow rates thereof, as shown in FIG. 6.

Figure 8:
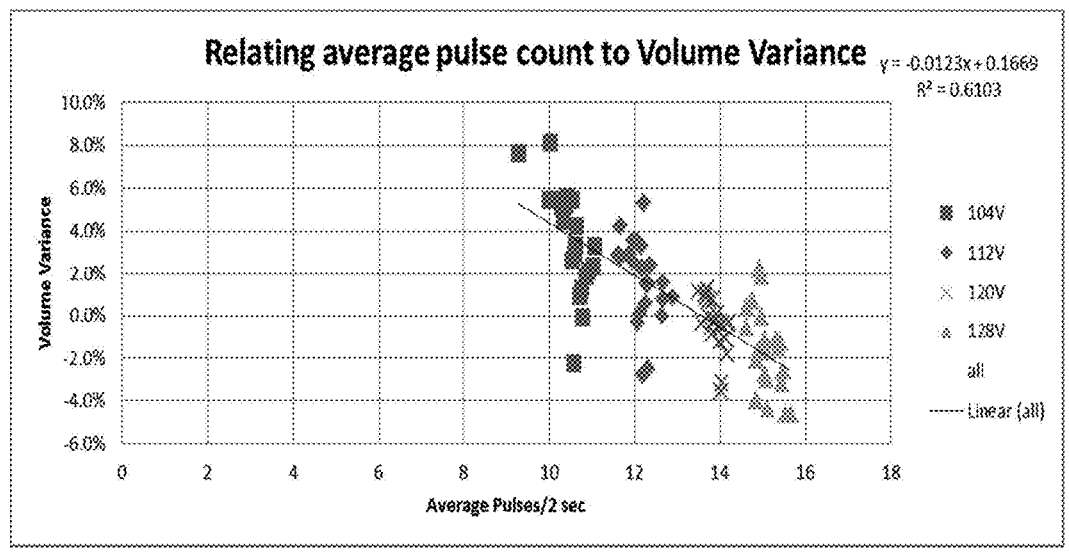
FIG. 8 is a graph comparing pulse rate to the volume variance for a plurality of beverage brewing apparatuses having varying operational parameters.

By applying similar transformations to the data collected from a plurality of units, for example 14 units, it was determined that although a spread in performance exists, most of the units followed a predictable trend illustrated in FIG. 8. FIG. 8, which compares average pulse rate to volumetric variance, clearly shows that in the absence of advanced calibration logic, the volume of water delivered via a flow meter 32 may drastically increase as the power to the system varies. It is also observed that a nominal calibration coefficient is centered about 13.4 average pulses, which corresponds to room temperature water being brewed using 120V of power. However, because the voltage range provided across the United States extends from between 107V to 128V and because most brewing apparatuses 20 instruct an operator to use cold water, it is desirable to set the neutral point of operation at averaged conditions assuming a power supply of 117V and a cold water temperature of about 3-5° C. Under these conditions, the average pulse count is approximately 10.2 pulses per 2 seconds. By adjusting the equation of the linear regression line of FIG. 8 to account for this shift in the average conditions, the resultant dynamic flow meter calibration scaling value is:

Scaling Value=−0.012305*$n_{pulses}$+1.25508

Application of this scaling value to the flow meter calibration coefficient allows the volume of fluid measured by the flow meter 32 to adjust dynamically during operation of the apparatus 20 to such that a more accurate amount of water is consistently provided for brewing a beverage.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A beverage brewing apparatus, comprising:
   a reservoir;
   a brew basket configured to contain a flavorant for preparing a brewed beverage;
   a heating mechanism fluidly coupled to the reservoir and the brew basket; and
   a flow meter configured to measure a volume of fluid supplied from the reservoir to said brew basket, wherein said flow meter is configured to calibrate dynamically during operation of the beverage brewing apparatus in response to at least one operating parameter of said beverage brewing apparatus, said dynamic calibration including determining a total volume of water delivered with each pulse of said flow meter.

2. The beverage system according to claim 1, wherein the at least one operating parameter includes voltage of the beverage system.

3. The beverage system according to claim 1, wherein the at least one operating parameter includes a temperature of the fluid.

* * * * *